United States Patent
Schwarzkopf

(10) Patent No.: US 7,750,585 B2
(45) Date of Patent: Jul. 6, 2010

(54) ASYMMETRIC CONTROL SYSTEM FOR A SENSORLESS AND BRUSHLESS ELECTRIC MOTOR

(75) Inventor: Johannes Schwarzkopf, Marktheidenfeld (DE)

(73) Assignee: Siemens VDO Automotive AG, Regensburg (DE)

( * ) Notice: Subject to any disclaimer, the term of this patent is extended or adjusted under 35 U.S.C. 154(b) by 236 days.

(21) Appl. No.: 11/916,917

(22) PCT Filed: Jun. 7, 2006

(86) PCT No.: PCT/EP2006/062965

§ 371 (c)(1),
(2), (4) Date: Dec. 12, 2007

(87) PCT Pub. No.: WO2006/134047

PCT Pub. Date: Dec. 21, 2006

(65) Prior Publication Data

US 2008/0197795 A1 Aug. 21, 2008

(30) Foreign Application Priority Data

Jun. 13, 2005 (EP) .................................. 05012654

(51) Int. Cl.
*H02P 23/12* (2006.01)
*H02P 1/04* (2006.01)

(52) U.S. Cl. ............................. 318/400.17; 318/400.14; 318/400.29; 318/400.01; 318/400.34; 388/915; 327/100; 327/544; 327/291

(58) Field of Classification Search ............ 318/400.17, 318/400.14, 400.01, 400.13, 809; 388/915; 327/100, 544, 291
See application file for complete search history.

(56) References Cited

U.S. PATENT DOCUMENTS 5,420,492 A * 5/1995 Sood et al. .................. 318/809

(Continued)

FOREIGN PATENT DOCUMENTS

| CN | 1150503 A | 5/1997 |
|---|---|---|
| DE | 19860448 | 6/2000 |
| DE | 10346711 | 5/2005 |

OTHER PUBLICATIONS

Search Report and Written Opinion for International Application No. PCT/EP2006/062965 (8 pages), Jun. 7, 2006.
Office Action from related Chinese Patent Application No. 200680021026.8, dated Dec. 17, 2009.

*Primary Examiner*—Rita Leykin
(74) *Attorney, Agent, or Firm*—Westman, Champlin & Kelly, P.A.

(57) ABSTRACT

A particularly high level of performance in a sensorless, electronically commutated multiphase electric motor can be achieved, wherein for one full cycle at least, one motor phase is controlled in an asymmetrical manner relative to a further motor phase by controlling a commutation angle of one motor phase by reduction relative to a corresponding commutation angle of the other motor phase. Alternatively or in addition, according to the aforementioned method, at least one motor phase is asymmetrically controlled by reduction by self-reference for a full cycle, a commutation angle being controlled by reduction relative to a preceding or subsequent commutation angle or the size of the intermediate angles between two commutation angles being varied, the reduced commutation angle always being preceded or followed by a measurement angle within which the relevant motor phase is switched at zero current for detecting the rotor position by measuring the counter-electromotive force.

21 Claims, 6 Drawing Sheets

U.S. PATENT DOCUMENTS

| | | | | |
|---|---|---|---|---|
| 5,616,996 | A * | 4/1997 | Tang et al. | 318/400.13 |
| 5,969,491 | A * | 10/1999 | Viti et al. | 318/400.35 |
| 6,034,493 | A * | 3/2000 | Boyd et al. | 318/400.31 |
| 6,208,113 | B1 * | 3/2001 | Lelkes et al. | 318/807 |
| 6,239,582 | B1 * | 5/2001 | Buzan et al. | 322/20 |
| 6,326,752 | B1 | 12/2001 | Jensen et al. | 318/439 |
| 6,534,938 | B1 * | 3/2003 | Wu et al. | 318/400.28 |
| 6,605,912 | B1 * | 8/2003 | Bharadwaj et al. | 318/400.09 |
| 6,801,382 | B2 * | 10/2004 | Kimura et al. | 360/73.03 |
| 7,030,583 | B2 * | 4/2006 | Lelkes et al. | 318/400.14 |
| 7,064,513 | B2 * | 6/2006 | Fenley | 318/700 |
| 2005/0258788 | A1 * | 11/2005 | Mori et al. | 318/254 |

* cited by examiner

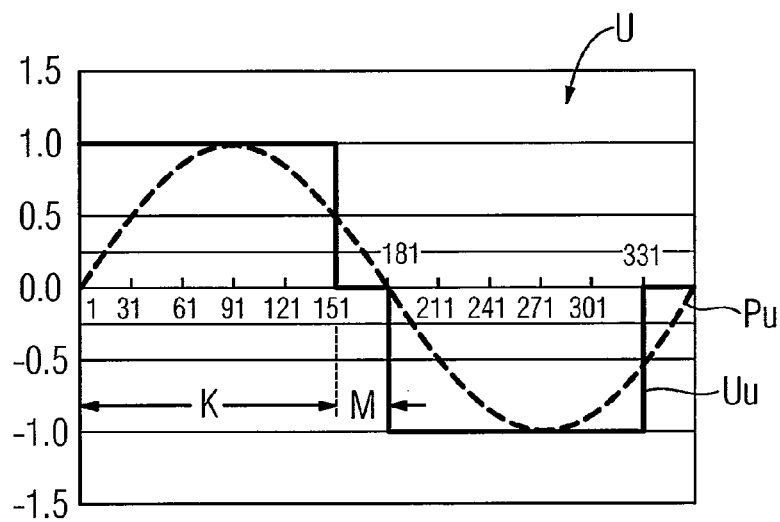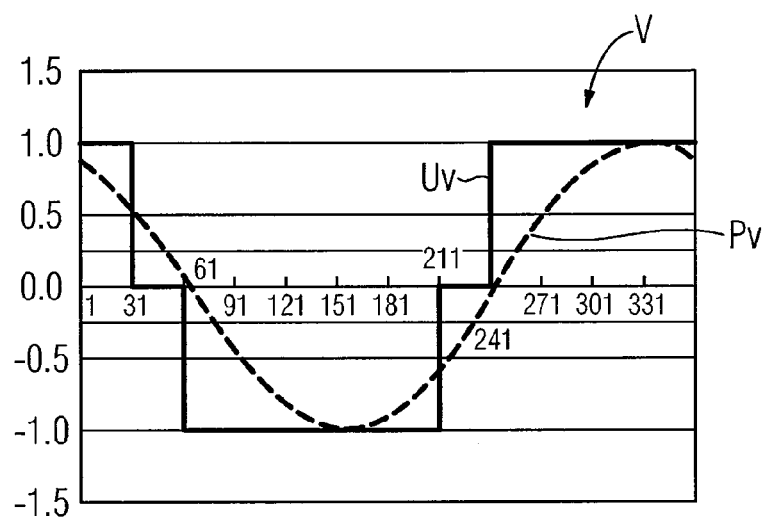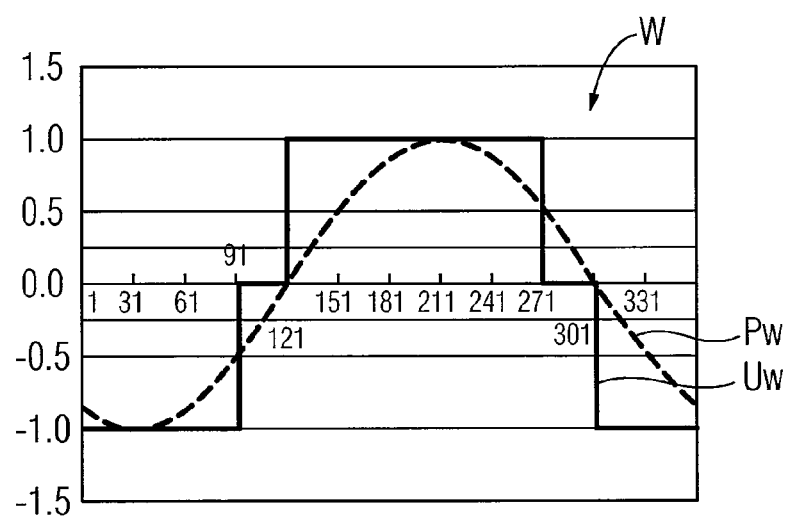
FIG 2

FIG 3
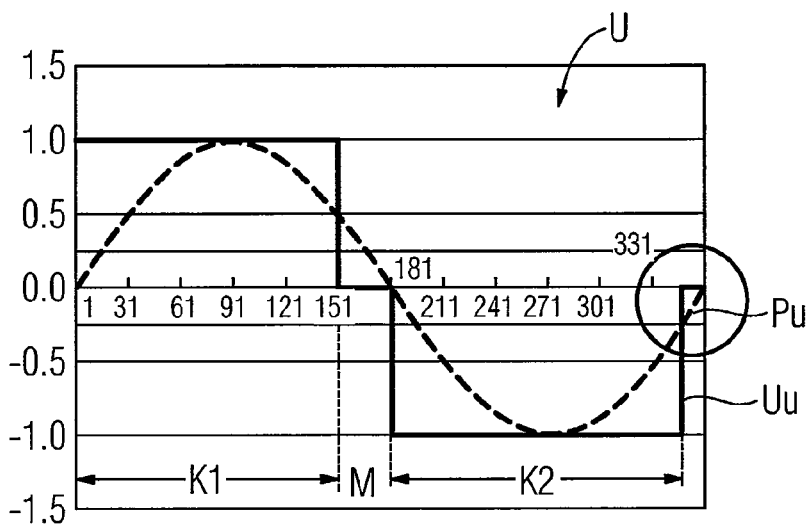
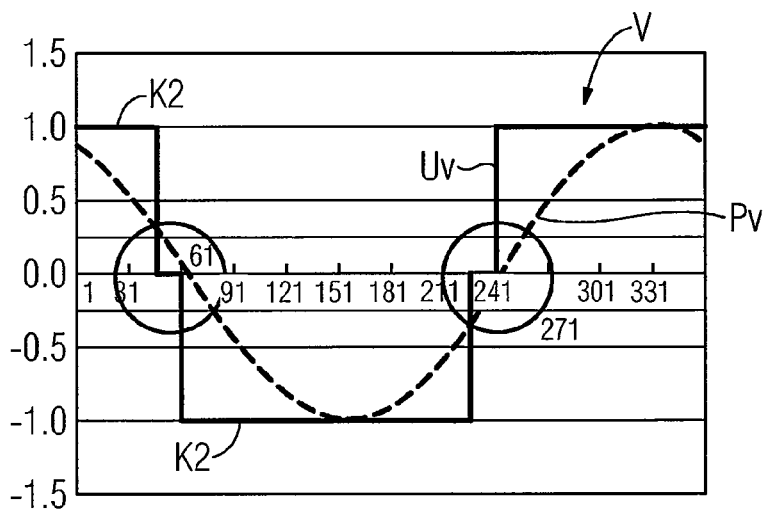
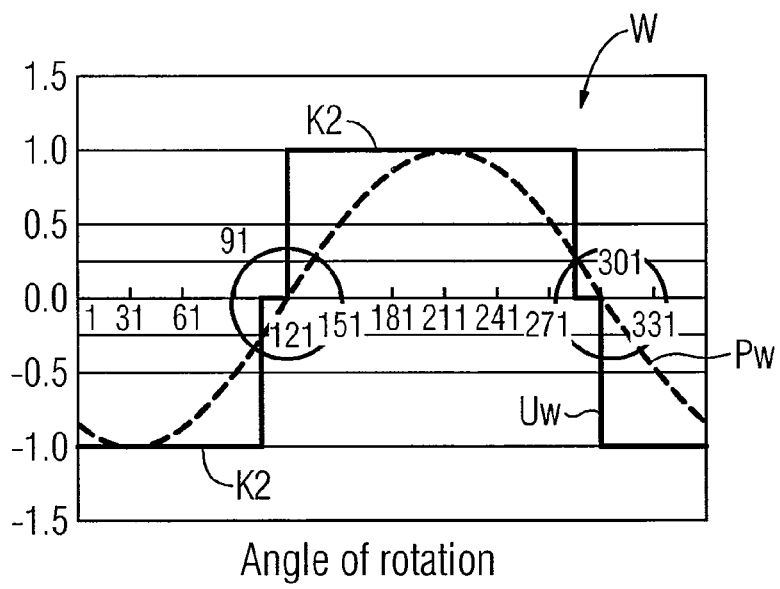
Angle of rotation

FIG 6
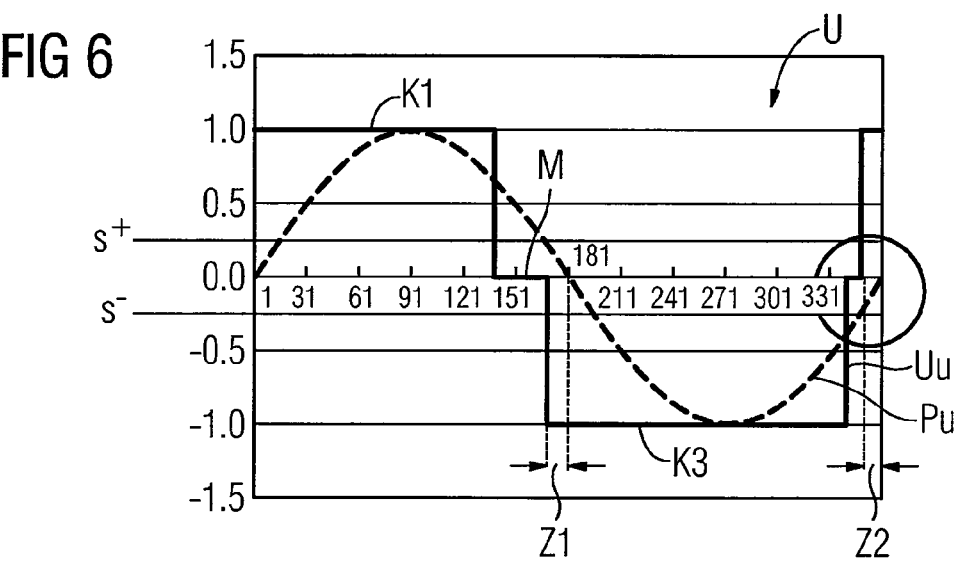
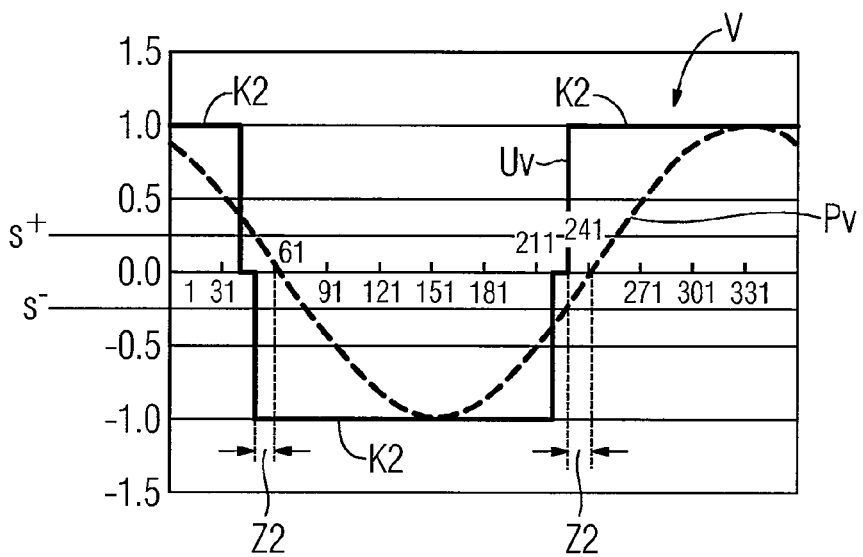
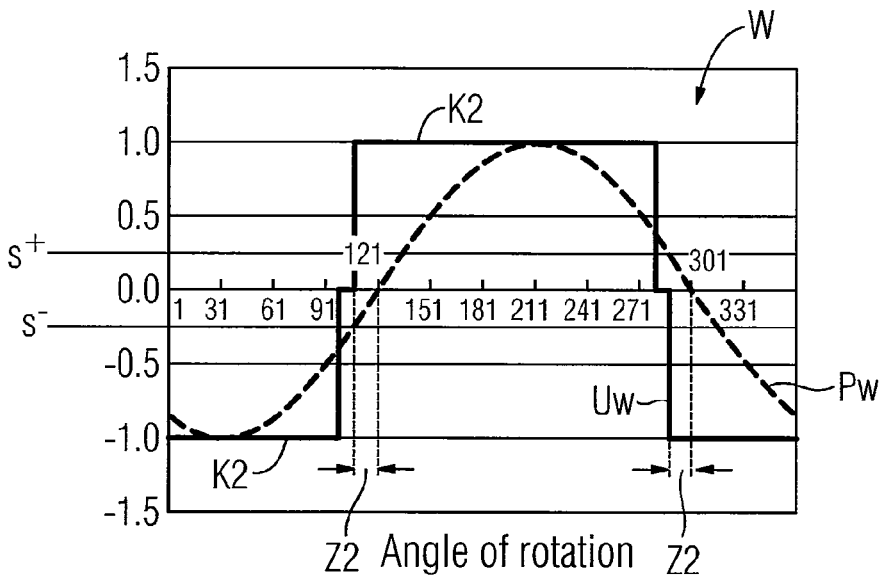

ASYMMETRIC CONTROL SYSTEM FOR A SENSORLESS AND BRUSHLESS ELECTRIC MOTOR

CROSS-REFERENCE TO RELATED APPLICATIONS

This application is a U.S. national stage application of International Application No. PCT/EP2006/062965 filed Jun. 7, 2006, which designates the United States of America, and claims priority to European application number 05012654.9 filed Jun. 13, 2005, the contents of which are hereby incorporated by reference in their entirety.

TECHNICAL FIELD

The invention relates to a method and to a device for the commutation of the motor phases of an electric motor.

BACKGROUND

In electronic, commutated electric motors (also called EC motors or BLDC motors) a three-phase network is generated across a converter circuit, passed to the coils of the stator of the electric motor and a rotating stator magnetic field thus generated. The rotor of the electric motor often has one or more permanent magnet(s) by which a static rotor magnetic field is generated. A torque, which sets the rotor in motion, results from the interaction of the stator magnetic field with the rotor magnetic field.

The converter circuit of the EC motor controls the phases of the three-phase network as a function of the position of the rotor which usually has to be determined metrologically. Sensors, such as Hall sensors, reed sensors or the like, which directly measure the rotor magnetic field, are frequently provided to determine the position, in particular to determine the angle of rotation, of the rotor. Alternatively, sensorless angle of rotation detectors are often used to determine the position of the rotor and not least of all for cost reasons. In this case what is known as the counter-electromotive force (counter-EMF) of the electric motor, i.e. the voltage induced in the stator coils by the rotating rotor magnetic field, is measured to determine the position. Motors of this kind are called brushless, sensorless electric motors.

A drawback of the sensorless angle of rotation detectors is that the counter-EMF can usually only be measured in a motor phase that is at zero current for the duration of the measurement. A number of measurement angles or measurement ranges is therefore provided, within which the relevant phase is kept at zero current, for one full cycle of the commutation (which with a 1-pole synchronous motor corresponds to a 360° full cycle of the rotor rotation) for measuring the counter-EMF. On the other hand the maximum size and position of the commutation angle is restricted by the or each measurement angle, the commutation angle in general clearly falling below the theoretically possible maximum angle of 180° as a result of this restriction. The commutation angle designates that part of the full cycle during which the or each phase is controlled in terms of circuitry, i.e. is excited. Commutation angles between 120° and 150° are usually used. An increase in the commutation angle usually leads to an increase in the output and efficiency of the electric motor, so it is often desirable to achieve the largest possible commutation angle.

The phases of an electric motor are conventionally symmetrical to each other, i.e. controlled in the same way. In particular commutation angles and measurement angles are adjusted in the same manner for all motor phases in this connection. Moreover, with bipolar commutation of an electric motor, the two commutation angles which correspond to positive and negative control of the same motor phase during the full cycle are also conventionally selected so as to be symmetrical, two identical measurement angles being alternately provided between the two commutation angles.

It is conventional to commutate the motor phases with the zero crossing of the counter-EMF in the corresponding motor phase. A positive advanced ignition can be used to obtain a greater output from a motor. In this connection it is not the zero crossing of the induced voltage that is detected as the trigger or start signal for the commutation angle, instead the counter EMF is compared with a reference voltage that differs from zero (in particular UL>0 volt with decreasing counter-EMF). The reference voltage must however be smaller than the intermediate circuit voltage since owing to the system the induced voltage is limited to the amount of the intermediate circuit voltage by the converter circuit. This limitation leads to limiting of the maximum adjustable advanced ignition angle and thus in turn to a limited output for the motor.

SUMMARY

According to various embodiments, a method for the commutation of the motor phases of an electric motor allows a particularly high motor output to be achieved using simple and inexpensive means.

According to an embodiment, a method for the commutation of the motor phases of a multi-phase electric motor, may comprise the steps of: —controlling for one full cycle at least one motor phase in an asymmetrical manner relative to a further motor phase by controlling a commutation angle of one motor phase in a shortened way with respect to a corresponding commutation angle of the other motor phase, and/or—controlling for one full cycle at least one motor phase asymmetrically with respect to itself by controlling a commutation angle in a shortened way with respect to a preceding or subsequent commutation angle and/or by providing intermediate angles of different sizes between two commutation angles, wherein the shortened commutation angle is preceded or followed by a measurement angle within which the relevant motor phase is switched at zero current for detecting a rotor position by measuring the counter-electromotive force.

According to a further embodiment, the reduced commutation angle may be from 120° to 165° and the corresponding unreduced commutation angle may be from 150° to 170°. According to a further embodiment, exactly one commutation angle may be controlled in a shortened way per full electric cycle.

According to a further embodiment, with bipolar commutation of the electric motor each motor phase can be controlled with exactly one shortened commutation angle and exactly one unreduced commutation angle per full cycle, wherein only the commutation angle associated with the lower or the upper half-waves of the bipolar control are shortened. According to a further embodiment, with bipolar commutation both commutation angles of a phase may be controlled in a shortened way compared with the corresponding commutation angles of the or each other phase. According to a further embodiment, the electric motor may be operated with advanced ignition.

According to another embodiment, a device for the commutation of the motor phases of a multi-phase electric motor, may comprise a converter circuit for commutation of the motor phases and comprising a control unit which is constructed for controlling the converter circuit according to the above mentioned method.

BRIEF DESCRIPTION OF THE DRAWINGS

Exemplary embodiments of the invention will be described in more detail hereinafter with reference to the drawings, in which:

FIG. 2 shows a graph to illustrate a conventional symmetrical commutation, FIG. 3 shows a graph to illustrate an unsymmetrical commutation as a first exemplary embodiment, FIG. 6 shows a graph to illustrate an unsymmetrical commutation with advanced ignition as a second exemplary embodiment.

Mutually corresponding parts and values are always provided with the same reference numerals in all figures.

DETAILED DESCRIPTION

Figure 1:
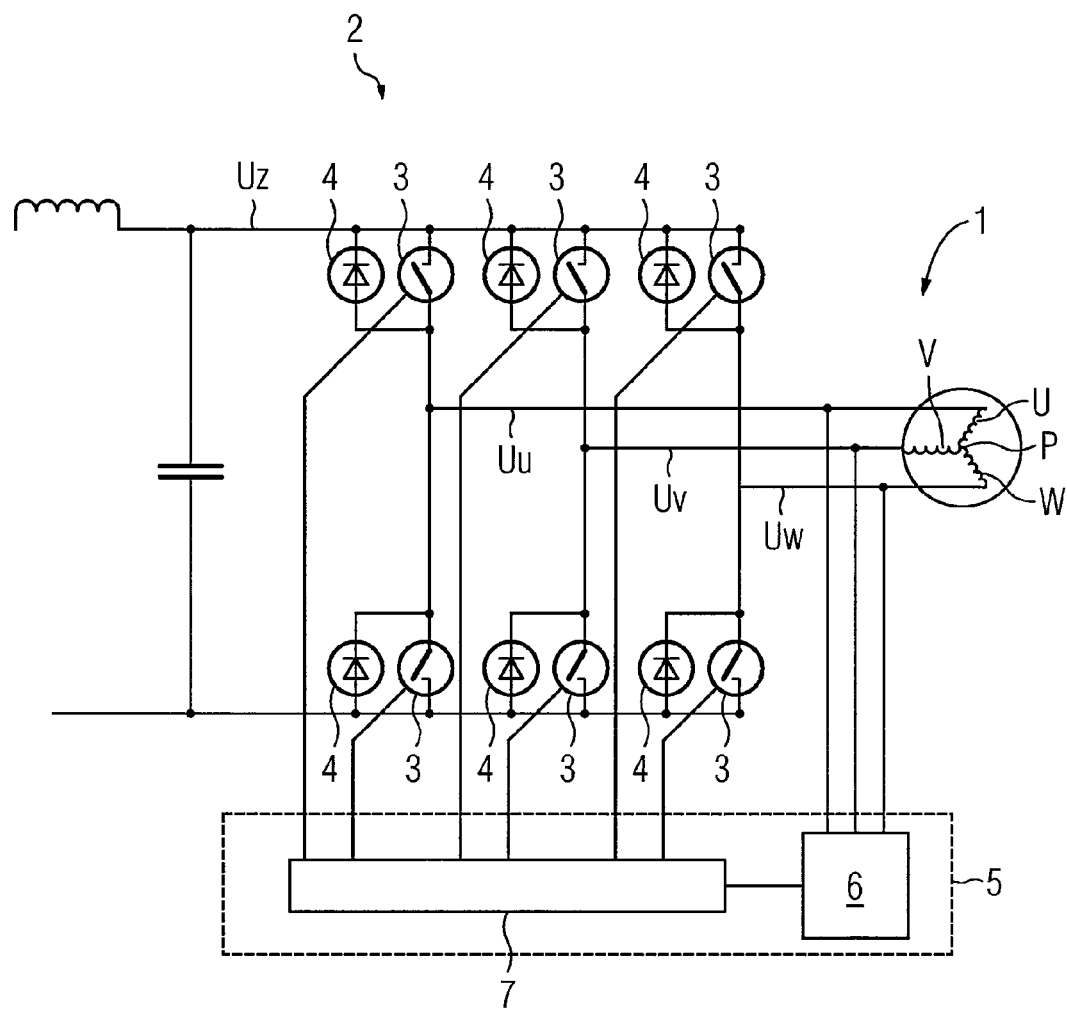
FIG. 1 shows a block diagram of a brushless and sensorless electric motor with converter circuit for carrying out the method according to an embodiment.

According to an embodiment, a method for the commutation of the motor phases of a brushless and sensorless electric motor is proposed, wherein, in contrast to conventional technology, the motor phases are asymmetrically controlled.

According to an embodiment, two variants that can be used independently of each other or in combination are proposed. These variants implement asymmetry. According to the first variant various motor phases are controlled in an asymmetrical manner relative to each other by controlling a commutation angle of one motor phase by reduction relative to a corresponding commutation angle of at least one other motor phase to create a sufficiently large preceding or subsequent measurement angle. The counter-EMF is therefore only detected in a portion of the motor phases, preferably only in a single motor phase, whereas for the other motor phases the commutation angle can be selected so as to be optimized irrespective of the limitations imposed by the counter-EMF measurement and therefore in particular within the framework of the technical possibilities.

According to the second variant, with bipolar motor control a motor phase is asymmetrically controlled by self-reference by controlling a commutation angle by reduction relative to the other commutation angle by the two commutation angles distributed over the full cycle, which angles correspond to the positive or negative half-wave of the control, in order to in turn keep a preceding or subsequent measurement angle free. In a specific case asymmetric commutation of this kind is also implemented by arranging two commutation angles of the same size and that are associated with one phase unsymmetrically on the full cycle, so a larger intermediate angle (measurement angle) and a smaller intermediate angle are formed between these commutation angles.

The commutation angle that is reduced by taking account of the measurement angle is hereinafter called the "measurement commutation angle" and the commutation angle that, by contrast, is not reduced is called the "output commutation angle". As in the case of conventional commutation methods, the relevant motor phase is switched at zero current within the measurement angle to determine the position of the rotor by measurement of the counter-EMF.

According to various embodiments, it is not necessary to transfer the limitation relating to the choice of advanced ignition angle and commutation angle, which is inevitably imposed by the sensorless determination of the position of the rotor, to all other phases and commutation part-cycles. Instead it is sufficient for only individual commutation angles to be reduced in size to allow point-wise position determination, while all or some of the remaining commutation angles have a larger angular range.

Overall asymmetrical motor control according to an embodiment leads to greater efficiency and greater output of the electric motor since, owing to the solely point-wise reduced commutation angle, the net commutation time is significantly increased for the full cycle compared with conventional commutation methods. At the same time the method according to an embodiment means that the motor can be constructed in such a way that loading of the buffer capacitors is reduced and the EMV properties are improved.

Similar advantages could previously only be achieved in electric motors, as are known from the prior art, by using relatively high-quality and therefore expensive components (thicker copper wires, better MOSFETS, better magnets, better buffer capacitors, better filters).

The size of the measurement commutation angle is expediently 120° to 150° and therefore matches the size of a commutation angle as is known in electric motors from the prior art with the same construction. The output commutation angle on the other hand is expediently from 150°, in particular 155°, up to approximately 180°. This value is achieved in that the output commutation angle at least partially includes the above-described measurement angle.

In a preferred development of the method only a single phase is commutated with a measurement commutation angle, so only a single item of information about the rotor position is detected during the full cycle.

To keep the asymmetry of the phases low—if this is required or expedient for the specific application—it may alternatively be provided (with bipolar control) that each phase is commutated with one measurement commutation angle and one output commutation angle per full cycle, all output commutation angles being associated with either only the lower or upper half-waves of bipolar control. In other words, all positive half-waves of the phases are commutated with measurement commutation angles and all negative half-waves with output commutation angles. Alternatively the allocation of positive and negative half-waves is inverted. This embodiment has the advantage that at least 50% of the half-waves are optimally used and the phases are congruent to each other with a delay. On the other hand there is asymmetry within each phase since negative and positive half-waves are not commutated in the same way. To further improve the output and efficiency of the electric motor it is optionally operated with advanced ignition. Even with this mode of operation it is provided that only a portion of the commutation angle is constructed as a measurement commutation angle and another portion as an output commutation angle.

The advantages achieved by the various embodiments therefore consist in particular in that by operating the electric motor unsymmetrically the limitations in the choice of commutation angle, which is caused by determining the position of the rotor, are not transferred to all phases or half-waves. On average a commutation angle and/or advanced ignition angle that is/are increased compared with conventional methods can thereby be attained, and therewith in turn a particularly high motor output.

FIG. 1 shows a block diagram of a brushless, sensorless electric motor 1 and a converter circuit 2 that is associated with the electric motor 1 as an energy supply. The illustrated electric motor 1 is controlled in a three-phase and bipolar manner. The method according to an embodiment can however also be used with unipolar motors, in motors with a different number of phases or in motors of which the windings are connected in a triangle.

The motor 1 shown in FIG. 1 comprises three motor phases U, V and W (hereinafter phases U, V, W for short) in a star connection arrangement. Each phase U, V, W comprises an armature winding arranged in the stator of the motor 1 and which is connected to an associated half bridge of the converter circuit 2. The armature windings of phases U, V, W are combined in a common star point or centre point P on the other hand. To supply an intermediate circuit voltage Uz via switching elements 3 of the associated half bridge of the converter circuit 2, the elements preferably being constructed as MOSFETS, each winding U, V, W can be constructed so as to be connected to an intermediate circuit of the converter circuit 2. A free-wheeling diode 4 is connected in parallel to each switching element 3 of the converter circuit 2. The switching elements 3 are controlled by a control unit 5 as a function of the rotor position of the motor 1 such that a rotating magnetic field is generated by the armature windings of the phases U, V, W to drive the motor 1. The rotor position is determined by a detector 6 of the control unit 5 by measuring the counter-electromotive force. The detector 6 emits a trigger signal that indicates the rotor position to a commutation generator 7 of the control unit 5, with the aid of which signal the commutation generator 7 in turn controls the switching elements 3.

The rotor of the motor 1 is preferably equipped with permanent magnets. The counter-electromotive force is measured in one or more of phase(s) U, V, W which in each case is switched at zero current for this measurement.

FIG. 2 illustrates a symmetrical commutation of the motor 1 as is conventionally employed, with the aid of three individual graphs arranged one above the other, in which commutation of the phases U, V, W is shown by plotting of the respective phase voltage Uu or Uv or Uw (shown in a simplified manner) over the angle of rotation of the motor 1. The individual graphs of FIG. 2 also show a phase fraction Pu or Pv or Pw in broken lines for each phase U, V, W and this is proportional in size to the counter-EMF induced in the respective phase U, V, W and therefore constitutes a measure of the rotor position in relation to the armature winding of the respective phase U, V, W.

The rotor position (represented by the orientation of the rotor magnetic field) is in each case oriented in a parallel or anti-parallel manner to the associated phase U, V, W at a zero crossing of the phase fraction Pu, Pv, Pw. The zero crossing of the phase fraction Pu, Pv, Pw is therefore accompanied by a change in the polarity sign of the counter-EMF in the corresponding phase U, V, W which is acquired metrologically by the detector 6. In the conventional commutation method according to FIG. 2 the rotor position at every change in the polarity sign of the counter-EMF from positive to negative is detected in phase U. In the illustrated example this takes place at an angle of rotation of 180°, as may be seen in the top individual graph in FIG. 2.

As measurement of the counter-EMF requires a certain measuring time, the position of the rotor cannot be determined in a punctiform manner with an angle of rotation of 180°. Instead measurement of the counter-EMF includes a measurement angle M that is different from zero and by which the rotor moves on during the measuring time. An angle of rotation interval of approx 20° is in particular required for filters, acceleration reserves, etc. Approximately a further 10° are required to reduce the freewheeling current, so an angle of rotation interval of approximately 30° should be proposed for the measurement angle M.

For the phase U the measurement angles to be proposed extend to an angle of rotation range of 150° to 180° according to the top individual graph of FIG. 2. Measurement must therefore start at an angle of rotation of 150° at the latest. Since measurement is only possible in the phase U that is not supplied with current, phase U must be commutated at 150°. The measurement angle M therefore inevitably limits the preceding commutation angle K, i.e. the angle of rotation interval, within which the phase U (or V or W) is controlled, to an angle of rotation interval of for example 150° maximum.

In the symmetrical commutation method illustrated in FIG. 2 the commutation angles K are selected so as to be uniform for all phases U, V, W. A uniform commutation angle K is also selected for the positive and negative half-waves of bipolar control within each phase U, V, W. By way of example the commutation angle K is 150° for each phase and each half-wave, each phase U, V, W, being commutated between the two commutation part-cycles by an angle of rotation interval that matches the measurement angle M.

FIG. 3 shows a graph to illustrate an asymmetrical commutation as a first exemplary embodiment. The graph shown in FIG. 3 is constructed in the same way as in FIG. 2 and likewise consists of three individual graphs that are associated with the respective phases U, V, W.

In contrast to the conventional commutation method, according to FIG. 3 a measurement angle M is only provided following a commutation angle K1 that corresponds to positive control of the phase U, whereby the size of this commutation angle K1 (hereinafter called the measurement commutation angle K1) matches the commutation angle K that can be attained with symmetrical commutation, and in particular is limited to a maximum of about 150°.

The commutation angle K2 corresponding to negative control of the phase U and the commutation angles K2 associated with phases V and W are selected independently of the measurement commutation angle K1 on the other hand. When determining this commutation angle K2 (hereinafter called the output commutation angle K2) no limiting measurement angle is taken into account, so the commutation angle K2 can be extended to about 180°.

In other words, the measurement commutation angle K1 is reduced relative to the output commutation angle K2 in the case of a correspondingly high output requirement of the motor 1. The phase U is therefore asymmetrically controlled both per se and compared with the further phases V and W. FIG. 3 shows this case. While the measurement commutation angle K1 assumes the maximum value, of for example about 150°, due to the assignment of the measurement angle M, a value of, for example, 165° that is increased by contrast is associated with the output commutation angles K2.

If the asymmetry of phase U to the other phases V and W is not acceptable, in a modification of the method according to an embodiment the output commutation angles K2 are applied to the negative half-waves of all phases U, V, W whereas the positive half-waves of the phases U, V, W are commutated with reduced measurement commutation angles K1. Fifty percent of the half-waves are optimally used thereby and the phases are symmetrical to each other, i.e. are congruent with a delay. The asymmetry of the control manifests itself in this modification in different control of the upper half-waves in relation to the lower half-waves without each phase U, V, W.

FIG. 4 shows a graph to again illustrate a conventional symmetrical commutation of the motor 1 with advanced ignition. The graph shown in FIG. 4 is again analogous to those in FIGS. 2 and 3.

Figure 4:
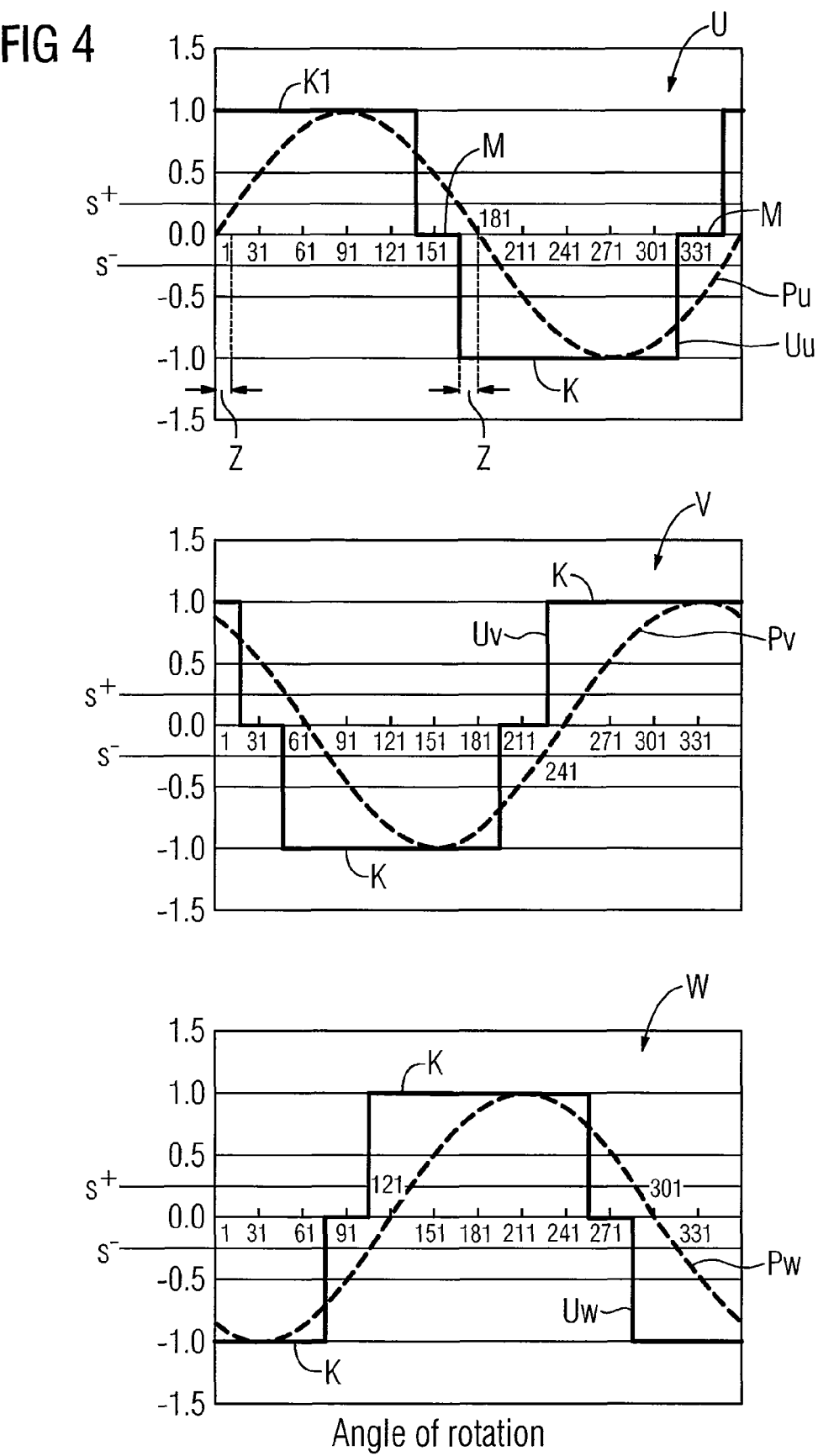
FIG. 4 shows a graph to illustrate a conventional symmetrical commutation with advanced ignition.

As shown in FIG. 4, in the case of commutation with advanced ignition the start of the commutation angle K does not coincide with the zero crossing of the associated phase fraction Pu, Pv, Pw. Instead the commutation angle K is moved forward with respect to the zero crossing of the phase fraction Pu, Pv, Pw. In other words, the phases U, V, W are already controlled if during decay toward zero the associated counter-EMF exceeds a reference value $S^+$, $S^-$ that is not zero. For the positive half-waves of the phase control a positive reference value $S^+$ is used; for the negative half-waves a negative reference value $S^-$ is used accordingly.

With symmetrical motor control according to FIG. 4 advanced ignition is only possible to a comparatively restricted extent, as will be described in more detail hereinafter with reference to FIG. 5, owing to the fact that it is only possible to detect the rotor position in the zero current state.

Figure 5:
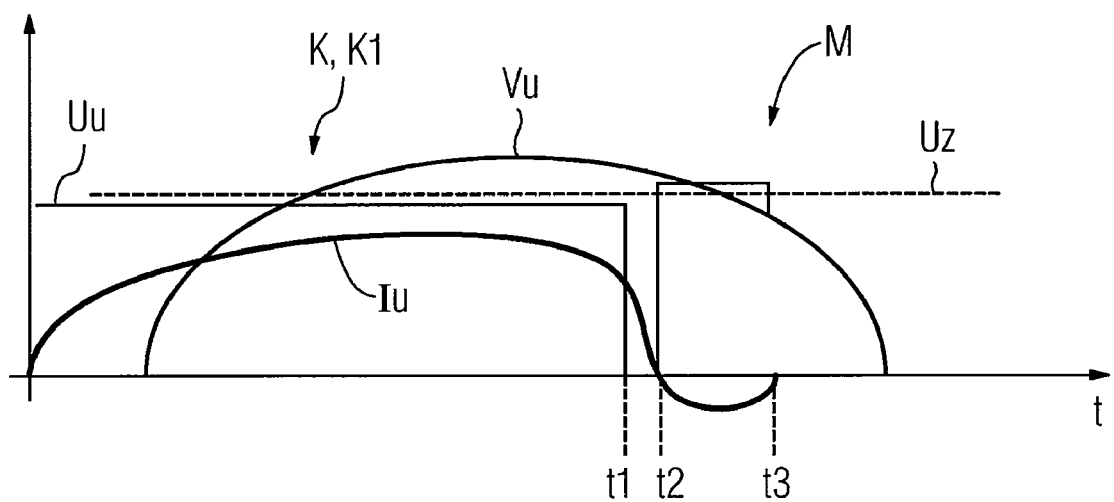
FIG. 5 shows a graph to illustrate the voltage and current characteristic during decay of a phase.

In a schematized graph FIG. 5 shows by way of example the characteristic of the phase voltage Uu and the associated phase current Iu for the phase U against time t. The characteristic of the counter-EMF Vu (broken lines) induced in phase U and the intermediate circuit voltage Zu that is constant during the commutation process are also shown in the graph.

Up to an instant t1 the phase U is connected to the intermediate circuit, i.e. is positively excited. The phase voltage Uu is constant up to the instant t1 and falls below the intermediate circuit voltage Uz by a small amount that corresponds to the forward voltage of the switching elements 3 connected in series. The phase current Iu is initially greater, passes through a maximum and even decreases slightly until an instant t1.

At instant t1 the examined phase U is decayed. For this purpose the polarity of the phase U is firstly reversed during a decay period that lasts until instant t2 according to FIG. 5, in particular is switched to negative intermediate circuit potential, whereby the phase voltage Uu breaks down and the phase current Iu rapidly decays. At instant t2, at which the phase current Iu has decayed, the phase U is disconnected from the intermediate circuit in order to measure the counter-EMF Vu.

If at instant t2 the counter-EMF Vu exceeds the intermediate circuit voltage Zu, and this is possible in particular with large advanced ignition, a current flow is built up in phase U by the counter-EMF and discharges via the upper free-wheeling diode 4 into the intermediate circuit. The phase voltage Uu consequently assumes a value which exceeds the intermediate circuit voltage Uz by the amount that corresponds to the forward voltage of the free-wheeling diode 4. Only if the counter-EMF Vu has fallen below the intermediate circuit voltage and the motor current Iu caused hereby has decayed—namely at an instant t3—is the counter-EMF Vu "visible" to the detector 6, i.e. can be measured in terms of amount, and can be used to determine the position of the rotor.

Since a further commutation can only take place once the position of the rotor has been determined, advanced ignition can therefore be employed at instant t3 at the earliest, whereby the maximum adjustable advanced ignition angle is limited.

With conventional symmetrical control of the motor 1 according to FIG. 4 this limitation of the advanced ignition angle inevitably has an effect on all phases U, V, W and each commutation cycle within each phase U, V, W.

When using advanced ignition within the framework of the unsymmetrical commutation method according to an embodiment, as is illustrated in FIG. 6 in a manner analogous to FIG. 4, only the commutation angle that follows a measurement angle M is subject to the above-described limitation with respect to the associated advanced ignition angle Z1. In FIG. 6 this affects only the second (measurement) commutation angle K3, which follows the measurement commutation angle K1 of phase U, which as a consequence of this limitation can likewise be reduced relative to the output commutation angles K2 of phases V and W.

The remaining five commutation cycles, corresponding to the measurement commutation angle K1 of phase U and the output commutation angles K2 of the phases V and W, can in contrast be brought forward, i.e. be operated with a larger advanced ignition angle Z2. In particular the measurement angle M according to FIG. 6 is created by cutting off the measurement commutation angle K1 of phase U at the "trailing end" and the following (measurement) commutation angle K3 at the "leading end". By way of example Z2 is up to 10° greater than Z1. The difference can however amount to 30° or more in other embodiments. The difference can primarily be very large if the position can only be detected in the zero crossing of the counter-EMF.

What is claimed is:

1. A method for the commutation of the motor phases of a multi-phase electric motor, comprising the steps of:
controlling for one full cycle at least one motor phase in such a manner relative to a further motor phase that a commutation angle of one motor phase is controlled in a shortened way with respect to a corresponding commutation angle of the other motor phase, and
controlling for one full cycle at least one motor phase in such a manner that a commutation angle is controlled in a shortened way with respect to a preceding or subsequent commutation angle and that intermediate angles of different sizes between two commutation angles are provided, wherein the shortened commutation angle is preceded or followed by a measurement angle within which the relevant motor phase is switched at zero current for detecting a rotor position by measuring the counter-electromotive force.

2. The method according to claim 1, wherein the shortened commutation angle is from 120° to 165° and wherein the corresponding unshortened commutation angle is from 150° to 170°.

3. The method according to claim 1, wherein exactly one commutation angle is controlled in a shortened way per full electric cycle.

4. The method according to claim 1, wherein with bipolar commutation of the electric motor each motor phase is controlled with exactly one shortened commutation angle and exactly one unshortened commutation angle per full cycle, wherein only the commutation angle associated with the lower or the upper half-waves of the bipolar control are shortened.

5. The method according to claim 1, wherein with bipolar commutation both commutation angles of a phase are controlled in a shortened way compared with the corresponding commutation angles of the or each other phase.

6. The method according to claim 1, wherein the electric motor is operated with advanced ignition.

7. A device for the commutation of the motor phases of a multi-phase electric motor, comprising a converter circuit for commutation of the motor phases and comprising a control unit which is constructed for controlling the converter circuit according to the method of claim 1.

8. A method for the commutation of the motor phases of a multi-phase electric motor, comprising the steps of:

controlling for one full cycle at least one motor phase in such a manner relative to a further motor phase that a commutation angle of one motor phase is controlled in a shortened way with respect to a corresponding commutation angle of the other motor phase, or controlling for one full cycle at least one motor phase in such a manner that a commutation angle is controlled in a shortened way with respect to a preceding or subsequent commutation angle or that intermediate angles of different sizes between two commutation angles are provided, wherein the shortened commutation angle is preceded or followed by a measurement angle within which the relevant motor phase is switched at zero current for detecting a rotor position by measuring the counter-electromotive force.

9. The method according to claim 8, wherein the shortened commutation angle is from 120° to 165° and wherein the shortened commutation angle is from 150° to 170°.

10. The method according to claim 8, wherein exactly one commutation angle is controlled in a shortened way per full electric cycle.

11. The method according to claim 8, wherein with bipolar commutation of the electric motor each motor phase is controlled with exactly one shortened commutation angle and exactly one shortened commutation angle per full cycle, wherein only the commutation angle associated with the lower or the upper half-waves of the bipolar control are shortened.

12. The method according to claim 8, wherein with bipolar commutation both commutation angles of a phase are controlled in a shortened way compared with the corresponding commutation angles of the or each other phase.

13. The method according to claim 8, wherein the electric motor is operated with advanced ignition.

14. A device for the commutation of the motor phases of a multi-phase electric motor, comprising a converter circuit for commutation of the motor phases and comprising a control unit which is constructed for controlling the converter circuit according to the method of claim 8.

15. A method for the commutation of the motor phases of a multi-phase electric motor, comprising the steps of:

controlling for one full cycle at least one motor phase in such a manner relative to a further motor phase that a commutation angle of one motor phase is controlled in a shortened way with respect to a corresponding commutation angle of the other motor phase, or controlling for one full cycle at least one motor phase in such a manner that a commutation angle is controlled in a shortened way with respect to a preceding or subsequent commutation angle and that intermediate angles of different sizes between two commutation angles are provided, wherein the shortened commutation angle is preceded or followed by a measurement angle within which the relevant motor phase is switched at zero current for detecting a rotor position by measuring the counter-electromotive force.

16. The method according to claim 15, wherein the shortened commutation angle is from 120° to 165° and wherein the corresponding shortened commutation angle is from 150° to 170°.

17. The method according to claim 15, wherein exactly one commutation angle is controlled in a shortened way per full electric cycle.

18. The method according to claim 15, wherein with bipolar commutation of the electric motor each motor phase is controlled with exactly one shortened commutation angle and exactly one shortened commutation angle per full cycle, wherein only the commutation angle associated with the lower or the upper half-waves of the bipolar control are shortened.

19. The method according to claim 15, wherein with bipolar commutation both commutation angles of a phase are controlled in a shortened way compared with the corresponding commutation angles of the or each other phase.

20. The method according to claim 15, wherein the electric motor is operated with advanced ignition.

21. A device for the commutation of the motor phases of a multi-phase electric motor, comprising a converter circuit for commutation of the motor phases and comprising a control unit which is constructed for controlling the converter circuit according to the method of claim 15.

* * * * *

UNITED STATES PATENT AND TRADEMARK OFFICE
CERTIFICATE OF CORRECTION

PATENT NO. : 7,750,585 B2
APPLICATION NO. : 11/916917
DATED : July 6, 2010
INVENTOR(S) : Schwarzkopf et al.

It is certified that error appears in the above-identified patent and that said Letters Patent is hereby corrected as shown below:

Column 9, line 18 should be:
-- corresponding unshortened commutation angle is from 150° to 170°. --

Column 9, line 25 should be:
-- exactly one unshortened commutation angle per full cycle, --

Column 10, line 18 should be:
-- corresponding unshortened commutation angle is from 150° to 170°. --

Column 10, line 28 should be:
-- exactly one unshortened commutation angle per full cycle, --

Signed and Sealed this
Twenty-sixth Day of April, 2011

David J. Kappos
*Director of the United States Patent and Trademark Office*